United States Patent
Motohashi et al.

(10) Patent No.: US 11,001,012 B2
(45) Date of Patent: May 11, 2021

(54) MOLDED ARTICLE OF FIBER-REINFORCED RESIN AND COMPRESSION MOLDING METHOD THEREFOR

(71) Applicant: Toray Industries, Inc., Tokyo (JP)

(72) Inventors: Tetsuya Motohashi, Nagoya (JP); Takafumi Hashimoto, Nagoya (JP); Chiasa Sato, Nagoya (JP); Ichiro Taketa, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 86 days.

(21) Appl. No.: 16/085,018

(22) PCT Filed: Feb. 23, 2017

(86) PCT No.: PCT/JP2017/006717
§ 371 (c)(1),
(2) Date: Sep. 14, 2018

(87) PCT Pub. No.: WO2017/159264
PCT Pub. Date: Sep. 21, 2017

(65) Prior Publication Data
US 2019/0091944 A1 Mar. 28, 2019

(30) Foreign Application Priority Data

Mar. 16, 2016 (JP) .............................. JP2016-052457

(51) Int. Cl.
*B29C 70/14* (2006.01)
*C08J 5/04* (2006.01)
(Continued)

(52) U.S. Cl.
CPC .............. *B29C 70/14* (2013.01); *B29B 11/02* (2013.01); *B29B 15/08* (2013.01); *B29C 43/34* (2013.01);
(Continued)

(58) Field of Classification Search
CPC ......... C08J 5/047; C08J 5/042; D04H 1/4218; D04H 1/4242; D04H 1/4342; D04H 1/587;
(Continued)

(56) References Cited

U.S. PATENT DOCUMENTS

2015/0203663 A1* 7/2015 Sonoda .................... C08J 5/047
524/495

FOREIGN PATENT DOCUMENTS

JP   2009-062474 A   3/2009
JP   2009-114612 A   5/2009
(Continued)

*Primary Examiner* — Camie S Thompson
(74) *Attorney, Agent, or Firm* — DLA Piper LLP (US)

(57) ABSTRACT

A molded article of a fiber-reinforced resin contains at least a bundled aggregate [A] of discontinuous reinforcing fibers and a matrix resin [M], wherein the average layer thickness h in the molded article of the fiber-reinforced resin is 100 μm or less and the CV value of the average layer thickness h is 40% or less; and a compression molding method therefor. It is possible to reliably and greatly reduce the occurrence of stress concentration in the molded article and to thereby achieve higher mechanical properties and further reduce variation in the mechanical properties.

10 Claims, 13 Drawing Sheets

(51) Int. Cl.
  *B29C 43/34* (2006.01)
  *B29B 15/08* (2006.01)
  *B29B 11/02* (2006.01)
  *B29C 70/46* (2006.01)
  *B29C 70/54* (2006.01)
  *B29K 307/04* (2006.01)

(52) U.S. Cl.
  CPC ............ *B29C 70/46* (2013.01); *B29C 70/545* (2013.01); *C08J 5/04* (2013.01); *B29K 2307/04* (2013.01); *B29K 2995/0082* (2013.01)

(58) Field of Classification Search
  CPC ......... B29C 70/12; B29C 70/14; B29C 70/46; B29C 70/54; B29C 70/545; B29C 43/34; Y10T 428/24479; Y10T 428/268; B29B 15/08; B29B 11/02; B29K 307/04; B29K 2995/0082
  USPC .............................. 428/297.4, 156, 220, 338
  See application file for complete search history.

(56) References Cited

FOREIGN PATENT DOCUMENTS

| JP | 2009-274412 A | 11/2009 |
|---|---|---|
| JP | 2013-202890 A | 10/2013 |
| JP | 5572947 B2 | 7/2014 |
| WO | 2014/017612 A1 | 1/2014 |

\* cited by examiner

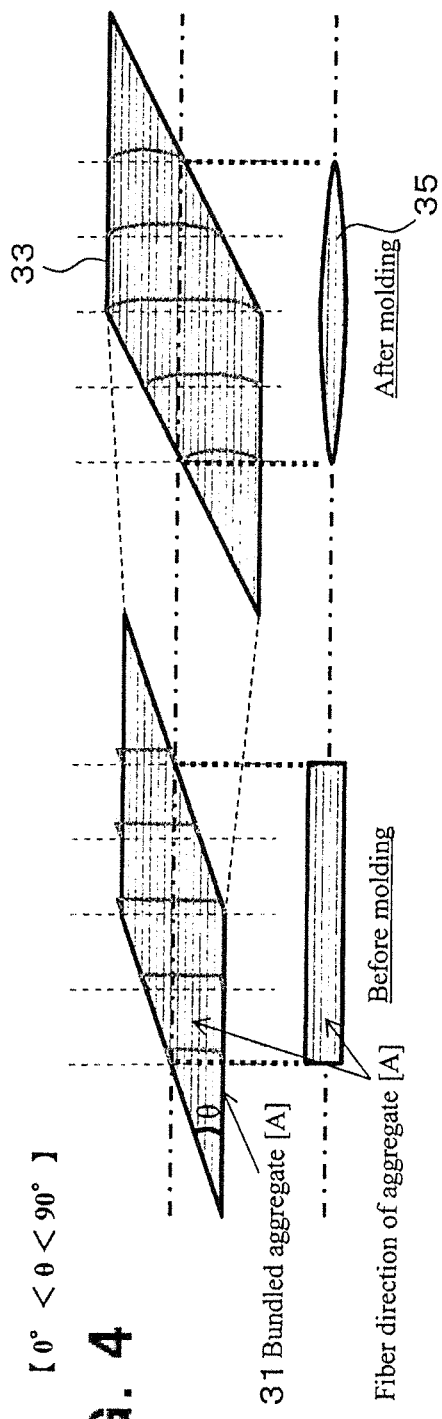
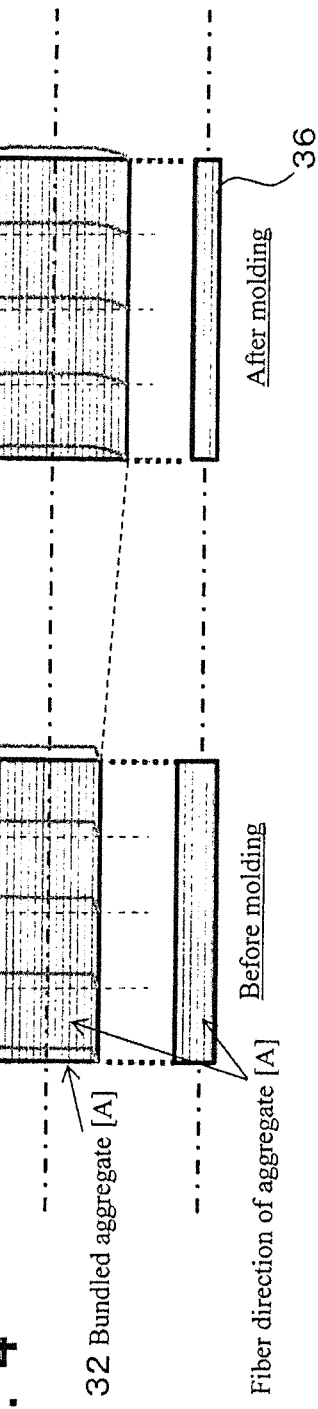

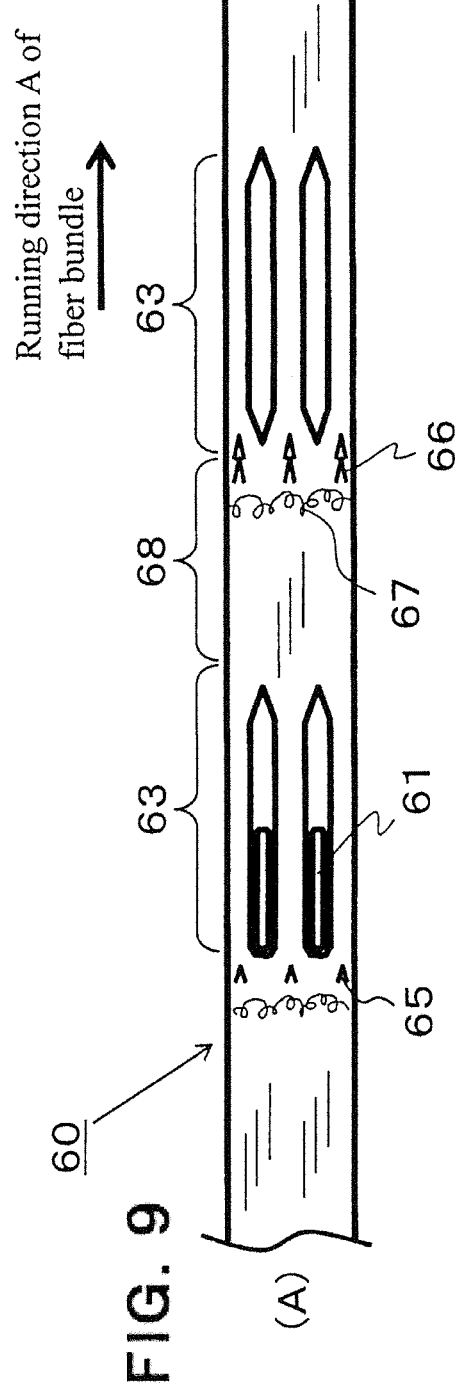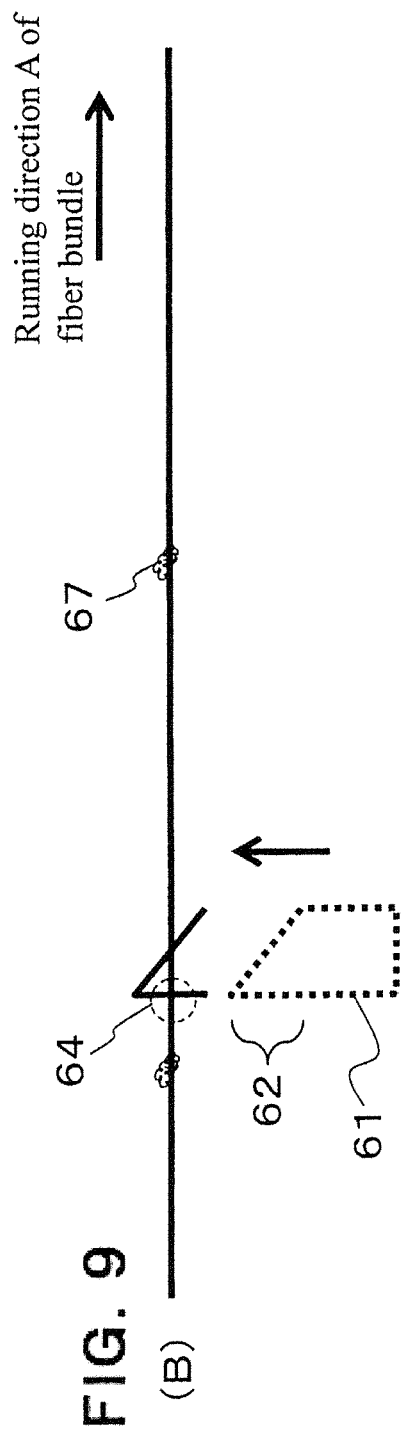
FIG. 9

FIG. 10
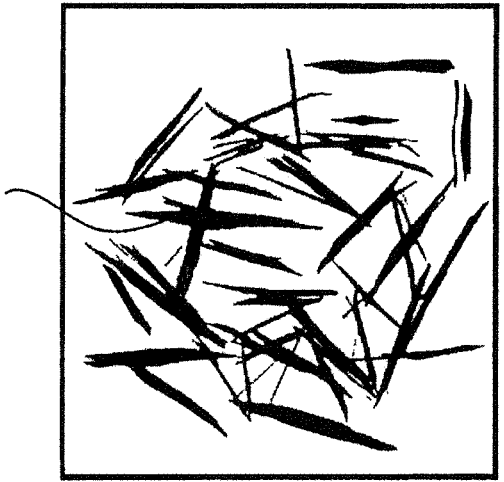
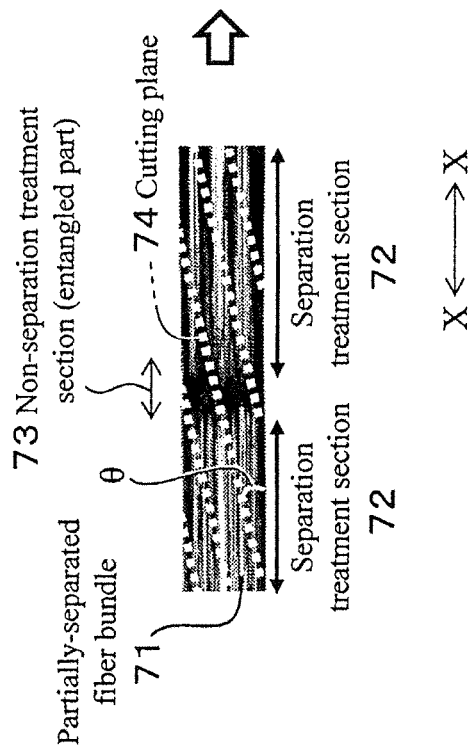

MOLDED ARTICLE OF FIBER-REINFORCED RESIN AND COMPRESSION MOLDING METHOD THEREFOR

TECHNICAL FIELD

This disclosure relates to a molded article of a fiber-reinforced resin and a compression molding method therefore and, specifically, to a molded article of a fiber-reinforced resin capable of exhibiting higher mechanical properties and further reducing the variation of the mechanical properties, and a compression molding method therefore.

BACKGROUND

Conventionally, a fiber-reinforced resin molding material containing bundled aggregates of discontinuous reinforcing fibers (fiber bundles) and a matrix resin and a molded article of a fiber-reinforced resin compression-molded by heating and pressing using a large number of the fiber-reinforced resin molding materials are known. In a conventional general fiber-reinforced resin molding material, because the fiber bundle of discontinuous reinforcing fibers consists of a relatively large number of reinforcing fibers, and its layer thickness is relatively large, and because the fiber bundle of discontinuous reinforcing fibers is formed by being cut in a direction orthogonal to the lengthwise direction of the fiber bundle, in the molded article, the state of the load transmission to the adjacent fiber bundle at the end portion of each fiber bundle rapidly changes, and stress concentration is liable to occur at that portion. It thus tends to cause a limit for improvement of the mechanical properties of the molded article and also cause a limit for reduction of the variation of the mechanical properties.

On the other hand, a molding material wherein in each fiber bundle cross section, a transition section in which the number of fibers changes and an invariable section in which the number of fibers is invariable are provided, and by specifying the amount of change in the total sectional area in the cross section and by changing the width of the fiber bundle at the end portion of the fiber bundle so as to gently become smaller, it becomes possible to reduce the occurrence of stress concentration as described above, thereby improving the mechanical properties of the molded article, and a fiber-reinforced plastic using the molding material, are proposed (Japanese Patent No. 5572947).

By the above-described proposal of JP '947, it became possible to reduce the occurrence of stress concentration in molded articles and improve the mechanical properties of molded articles. However, such a stress concentration in the molded article essentially occurs originating from the rapid shape change at the end portion of the fiber bundle of discontinuous reinforcing fibers inherent in the molded article relative to the adjacent fiber bundle, although one cause of such a rapid shape change is a rapid change of the width of the fiber bundle at the end portion of the fiber bundle (a rapid change of the width of the fiber bundle due to cutting the fiber bundle in a direction orthogonal to the lengthwise direction of the fiber bundle), more essentially, it is considered that it is originating from a rapid change of the thickness of the fiber bundle at the end portion of the fiber bundle (that is, a rapid change due to suddenly becoming zero in thickness of fiber bundle at the end of the fiber bundle). Such a more essential cause is not mentioned in JP '947.

Accordingly, focusing on the more essential cause of the occurrence of stress concentration in a molded article, there is a need to provide a molded article of a fiber-reinforced resin capable of reducing the occurrence of stress concentration in the molded article reliably and greatly, thereby capable of exhibiting higher mechanical properties and further reducing the variation of the mechanical properties, and a compression molding method therefore.

SUMMARY

We provide a molded article of a fiber-reinforced resin containing at least a bundled aggregate [A] of discontinuous reinforcing fibers and a matrix resin [M], and is characterized in that the average layer thickness h in the molded article of the fiber-reinforced resin is 100 μm or less, and a CV (Coefficient of Variation) value of the average layer thickness h is 40% or less. The average layer thickness h in the molded article of the fiber-reinforced resin is determined by burning off the matrix resin [M] of the molded article of the fiber-reinforced resin (hereinafter, also referred to as FRP), selecting 20 points in the in-plane direction of the burnt off FRP, measuring the number of layers n1 of bundled aggregate [A] of discontinuous reinforcing fibers remaining in the thickness direction of each point, and determining as an average value of the values obtained by dividing the original FRP thickness by n1.

In such a molded article of a fiber-reinforced resin, the average value of the thicknesses of the bundled aggregates [A] (hereinafter, also referred to as "fiber bundle [A]") of discontinuous reinforcing fibers in the inner FRP layers stacked in the thickness direction inside the FRP is to be determined as the average layer thickness h, and by suppressing this average layer thickness h to a small thickness of 100 μm or less, the rapid change of the thickness of the fiber bundle at the end portion of the fiber bundle [A] in the lengthwise direction of the fiber bundle (extension direction of the discontinuous reinforcing fibers) is suppressed, thereby suppressing the occurrence of stress concentration in the molded article due to the rapid change of the thickness of the fiber bundle, and it becomes possible to exhibit higher mechanical properties in the molded article. Then, by suppressing the CV value (Coefficient of Variation) of the average layer thickness h to 40% or less, it becomes possible to reduce the variation of the exhibited high mechanical properties.

It is preferred that the molded article of the fiber-reinforced resin is subjected to ashing treatment, 20 bundled aggregates [A] are selected, the ratio 1/L of the average fiber bundle length 1 to the average fiber length L of the selected bundled aggregates [A] is 1.1 or more, and the flatness rate calculated from the ratio w/h of the width of fiber bundle w, obtained by dividing the average projection area S of the bundled aggregate [A] by the average fiber length L, to the average layer thickness h is 5 or more. The feature in that the ratio 1/L of the average fiber bundle length 1 to the average fiber length L of the bundled aggregates [A] is 1.1 or more indicates, as described later, that it is an example wherein in the bundled aggregate [A], the single fibers forming the aggregate are in a form having a spread with respect to the lengthwise direction of the fiber bundle. As a more concrete preferable example, for example, an example can be exemplified wherein it is formed by cutting the fiber bundle in a direction oblique to the lengthwise direction of the fiber bundle. The feature in that the flatness rate calculated from the ratio w/h of the width of fiber bundle w to the average layer thickness h is 5 or more indicates that the bundled aggregate [A] is an extremely flat fiber bundle in which the thickness h is remarkably small relatively to the width w, and this makes it easier to achieve the small average layer thickness h defined. Thus, the bundled aggregate [A] is formed by oblique cutting as described above at the end portion of the fiber bundle, and the bundled aggregate [A] is extremely flat as a whole, whereby the occurrence of stress concentration at the end portion of the fiber bundle [A] in the lengthwise direction thereof can be further suppressed, and it becomes possible to exhibit higher mechanical properties in the molded article and further reduce the variation thereof.

It is preferred that cross-sectional observation is carried out in a homogeneous region of the molded article of the fiber-reinforced resin, and 80% or more of end portions of bundled aggregates [A], which are oriented with an angle α between a fiber direction and a plane of the cross-sectional observation within ±10°, among the observed bundled aggregates [A], have a taper angle δ of 10° or less. The "homogeneous region" indicates a region in which the form of the bundled aggregate [A] is easily disturbed by flow, avoiding the end portion of the molded article, and having a substantially uniform structure. As a more concretely preferable region to be exemplified, for example, preferred is a region that is at least 2 cm or more inward from the end of a flat-plate like molded article, although it depends upon the molded article size. As described above, the end portion of the bundled aggregate [A] has a tapered form such that the taper angle δ is 10° or less, whereby the shape change at the end portion of the bundled aggregate [A] of discontinuous reinforcing fibers in the stacked inner FRP layers can be extremely suppressed, the occurrence of stress concentration at the end portion of the fiber bundle [A] in the lengthwise direction of the bundled aggregate [A] is further suppressed, and it becomes possible to exhibit further high mechanical properties in the molded article and further reduce the variation thereof.

It is preferred that test pieces are cut out from the molded article of the fiber-reinforced resin in 4 directions of 0°, 45°, 90° and −45° when an arbitrary direction is set at 0°, a flexural modulus of each test piece is measured and the average flexural modulus Eb is obtained, and the average flexural modulus Eb satisfies equation (1):

$$Eb > Vf \times (3/8) \times Ef \times 0.65 \qquad (1)$$

Vf: volume content of reinforcing fibers contained in molded article of fiber-reinforced resin
Ef: modulus of reinforcing fibers contained in molded article of fiber-reinforced resin.
Namely, it shows the range of preferable value of the flexural modulus in the molded article of the fiber-reinforced resin which enables exhibition of high mechanical properties in the molded article and reduction of the variation thereof as described above.

It is preferred that test pieces are cut out from the molded article of the fiber-reinforced resin in 4 directions of 0°, 45°, 90° and −45° when an arbitrary direction is set at 0°, and when a flexural modulus of each test piece is measured, a CV value of the flexural modulus is 20% or less. Namely, it shows the preferable range of the CV value of the flexural modulus in the molded article of the fiber-reinforced resin which enables exhibition of high mechanical properties in the molded article and reduction of the variation thereof as described above.

It is preferred that test pieces are cut out from the molded article of the fiber-reinforced resin in 4 directions of 0°, 45°, 90° and −45° when an arbitrary direction is set at 0°, and when a flexural strength of each test piece is measured, a CV value of the flexural strength is 20% or less. Namely, it shows the preferable range of the CV value of the flexural strength in the molded article of the fiber-reinforced resin according to the present invention which enables exhibition of high mechanical properties in the molded article and reduction of the variation thereof as described above.

It is preferred that the molded article of the fiber-reinforced resin is subjected to ashing treatment, 20 bundled aggregates [A] are selected, and the average number of fibers of the selected bundled aggregates [A] is 6,000 or less. Namely, usually a fiber-reinforced resin molding material using a fiber bundle with a relatively large number of single fibers tends to have excellent production efficiency and excellent flowability during molding, but tends to be inferior in mechanical properties of a molded article, and on the contrary, a fiber-reinforced resin molding material using a fiber bundle with a relatively small number of single fibers tends to be superior in mechanical properties of a molded article, but tends to be difficult to improve flowability during molding. In view of such a tendency, in the molded article of the fiber-reinforced resin which makes it possible to exhibit high mechanical properties of a molded article and reduce the variation thereof as described above, with respect to the average number of fibers of the bundled aggregates [A] used as the main components of the fiber-reinforced resin molding material, the preferred range is indicated mainly from the viewpoint capable of securing to exhibit high mechanical properties.

The molded article of a fiber-reinforced resin can be molded by using a fiber-reinforced resin molding material containing a bundled aggregate [A] of discontinuous reinforcing fibers as described below and, in particular, the bundled aggregate [A] of discontinuous reinforcing fibers preferably takes the following form. Namely, the above-described bundled aggregate [A] is obtained by cutting a partially-separated fiber bundle, prepared by forming separation treatment sections separated into a plurality of bundles and non-separation treatment sections alternately along a lengthwise direction of a fiber bundle comprising a plurality of single fibers, at an angle θ (0°<θ<90°) with respect to the lengthwise direction of the fiber bundle. Thus, by the feature in that the bundled aggregate [A] of discontinuous reinforcing fibers is formed by cutting the partially-separated fiber bundle in which separation treatment sections and non-separation treatment sections are alternately formed, obliquely with respect to the lengthwise direction of the fiber bundle, that is, at an angle θ (0°<θ<90°) with respect to the lengthwise direction of the fiber bundle, as compared to a form of being cut in a direction orthogonal to the lengthwise direction of the fiber bundle, it becomes possible that the cutting plane extends over the separation treatment section and the non-separation treatment section, whereby, in particular, the end portion of the formed bundled aggregate [A] is liable to be formed in a shape in which a stress is difficult to be concentrated in the molded article (various examples will be described later), and further, it also becomes possible to more reduce the width of the bundled aggregate [A]. As a result, in the molded article, it is possible to exhibit higher mechanical properties (strength, elastic modulus) and further reduce the variation of the mechanical properties.

An example can be employed wherein, in the above-described partially-separated fiber bundle, an entangled part in which the single fibers are tangled with each other and/or an entanglement accumulation part in which the entangled parts are accumulated is formed in at least one end portion of at least one of the separation treatment sections.

An example can be employed wherein the bundled aggregate [A] in the fiber-reinforced resin molding material as described above, contains at least one kind of aggregate selected from: a separated bundle aggregate [a] divided into an arbitrary number of bundles by separation treatment; a joined bundle aggregate [b] in which single fibers of the fiber bundle are joined to each other by the non-separation treatment section and/or the entangled part and/or the entanglement accumulation part; and a joined cut aggregate [c] in which the non-separation treatment section and/or the entangled part and/or the entanglement accumulation part intersects with a cutting plane of the partially-separated fiber bundle at the time of being cut, and the joining of single fibers of the fiber bundle to each other is cut off at the intersected part. In this example, it is preferred that in the bundled aggregate [A], the content of the joined bundle aggregate [b] is 0 to 15%. Namely, although the joined bundle aggregate [b] may not be contained, in case of being contained, it is preferred to suppress the content at 15% at highest.

We also provide a compression molding method of the molded article of the fiber-reinforced resin as described above. That is, a compression molding method of a molded article of a fiber-reinforced resin is a compression molding method of molding a molded article of a fiber-reinforced resin as described above, and is characterized in that with respect to a fiber-reinforced resin molding material before molding and a molded article of a fiber-reinforced resin after molding, the compression molding method satisfies feature 1:

1: in the fiber-reinforced resin molding material, the number of layers in the thickness direction is measured at each of 20 points defined in the material in-plane direction and the average number of layers na is calculated, and after the molded article of the fiber-reinforced resin after molding is subjected to an ashing treatment, the number of layers in the thickness direction is measured at each of 20 points defined in the article in-plane direction after the ashing treatment and the average number of layers nb is calculated, and the ratio nb/na of nb to na is 1.2 or more.

Namely, the thickness of the FRP inner layer when it becomes the FRP after molding (that is, the thickness of the fiber bundle after molding in the molded article of the fiber-reinforced resin) is larger as the average thickness than the thickness of the original fiber bundle (that is, the layer thickness in the fiber-reinforced resin molding material before molding) (pseudo spreading effect is exhibited), but by setting nb/na at 1.2 or more, the average layer thickness h in the molded article of the fiber-reinforced resin can be easily reduced, thereby making it possible to more reliably achieve the improvement of the mechanical properties in the molded article and the reduction effect of the variation thereof.

According to the molded article of the fiber-reinforced resin and the compression molding method therefore, it is possible to reduce the occurrence of stress concentration in the molded article reliably and greatly, thereby to exhibit higher mechanical properties and further reduce the variation of the mechanical properties.

BRIEF DESCRIPTION OF THE DRAWINGS

FIGS. 4(A) and 4(B) are explanatory diagrams explaining the difference in shape change of a fiber bundle before and after molding occurring due to the cutting direction of the fiber bundle.

FIG. 9 shows a schematic plan view (A) and a schematic side view (B) showing an example of a method of manufacturing a partially-separated fiber bundle when using the partially-separated fiber bundle.

FIG. 10 is a schematic plan view of a partially-separated fiber bundle showing a basic technical concept obliquely cutting a fiber bundle.

Figure 1:
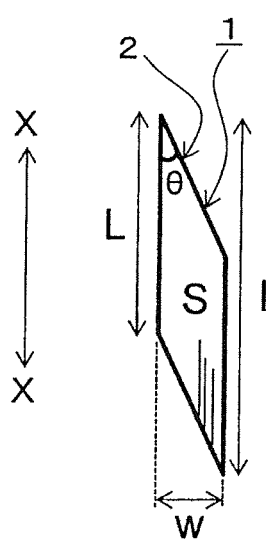
FIG. 1 is an explanatory diagram explaining the relationship between the fiber bundle length and average fiber length of a bundled aggregate [A] and the flatness rate.

EXPLANATION OF SYMBOLS 1, 5, 31, 32: bundled aggregate [A]
2: cutting plane
10, 20: molded article of fiber-reinforced resin
11: bundled aggregate [A] oriented with α within ±10°
21: test piece
33, 34: bundled aggregate [A]
35, 36: vertical sectional shape
41, 57, 71, 81, 91, 101, 111, 121: partially-separated fiber bundle
42, 53, 55, 63, 72, 82, 104, 114: separation treatment section
43, 54, 56, 68, 73, 92, 102, 112, 122: non-separation treatment section
44: cutting blade
51, 65, 103: entangled part
52, 66, 113: entanglement accumulation part
60: fiber bundle 61: separation means
62: protrusion
64: contact part
67: fluff accumulation
74, 75, 83, 93, 105, 115, 123: cutting plane
76, 77: bundled aggregate
200: winding direction of bobbin
201: drawing direction of fiber bundle
202: unwinding twist
203: fiber bundle containing unwinding twist

DETAILED DESCRIPTION

Hereinafter, our molded articles and methods will be explained together with examples referring to the figures.

The molded article of a fiber-reinforced resin is basically a molded article of a fiber-reinforced resin (FRP) containing at least a bundled aggregate [A] of discontinuous reinforcing fibers and a matrix resin [M], wherein the average layer thickness h in the molded article of the fiber reinforced resin is as thin as 100 µm or less and the CV value of the average layer thickness h is 40% or less. The average layer thickness h in the FRP is determined by burning off the matrix resin [M] of the FRP, selecting 20 points in the in-plane direction of the burned off FRP, measuring the number of layers n1 of bundled aggregate [A] of discontinuous reinforcing fibers remaining in the thickness direction of each point, and determining as an average value of the values obtained by dividing the original FRP thickness by n1. By setting such a small average layer thickness h and a low CV value, the occurrence of stress concentration in the molded article originating from the rapid change in the thickness of the fiber bundle is suppressed, and it becomes possible to exhibit higher mechanical properties in the molded article as well as to reduce the variation of the mechanical properties.

It is preferred that the molded article of the fiber-reinforced resin is subjected to ashing treatment, 20 bundled aggregates [A] are selected, the ratio 1/L of the average fiber bundle length 1 to the average fiber length L of the selected bundled aggregates [A] is 1.1 or more, and the flatness rate calculated from the ratio w/h of the width of fiber bundle w, obtained by dividing the average projection area S of the bundled aggregate [A] by the average fiber length L, to the average layer thickness h is 5 or more. Each value is expressed, for example, as shown in FIG. 1. The fiber bundle length 1 of the bundled aggregate [A] 1 and the average fiber length L of the bundled aggregate [A] 1 are represented as shown in FIG. 1, and the feature that the ratio 1/L of the fiber bundle length 1 to the average fiber length L is 1. A value of 1.1 or more indicates that in the bundled aggregate [A], single fibers forming the aggregate have a form spreading in the fiber bundle direction, as aforementioned. A concrete preferred example thereof is that the bundled aggregate [A] 1 as shown in FIG. 1 is formed by cutting a fiber bundle in a direction oblique to the lengthwise direction X-X of the fiber bundle at a cutting angle θ, and the end portion of the bundled aggregate [A] 1 is formed by a cutting plane 2. The average projection area S and the width of fiber bundle w of the bundled aggregate [A] 1 are represented as shown in FIG. 1, the width of fiber bundle w is determined by dividing the average projection area S by the average fiber length L, and the flatness rate is calculated from the ratio w/h of the width of fiber bundle w to the average layer thickness h. This flatness rate of 5 or more indicates that the bundled aggregate [A] 1 is a very flat form fiber bundle having a thickness h which is significantly smaller than the width w, and by this, the small average layer thickness h defined in the present invention is achieved more easily. By the condition where the bundled aggregate [A] 1 is formed by oblique cutting at the end portion of the fiber bundle and the bundled aggregate [A] 1 is extremely flat as a whole, the occurrence of stress concentration at the end portion in the lengthwise direction of the fiber bundle [A] 1 is further suppressed, and exhibition of higher mechanical properties in the molded article and further reduction thereof become possible.

Figure 2:
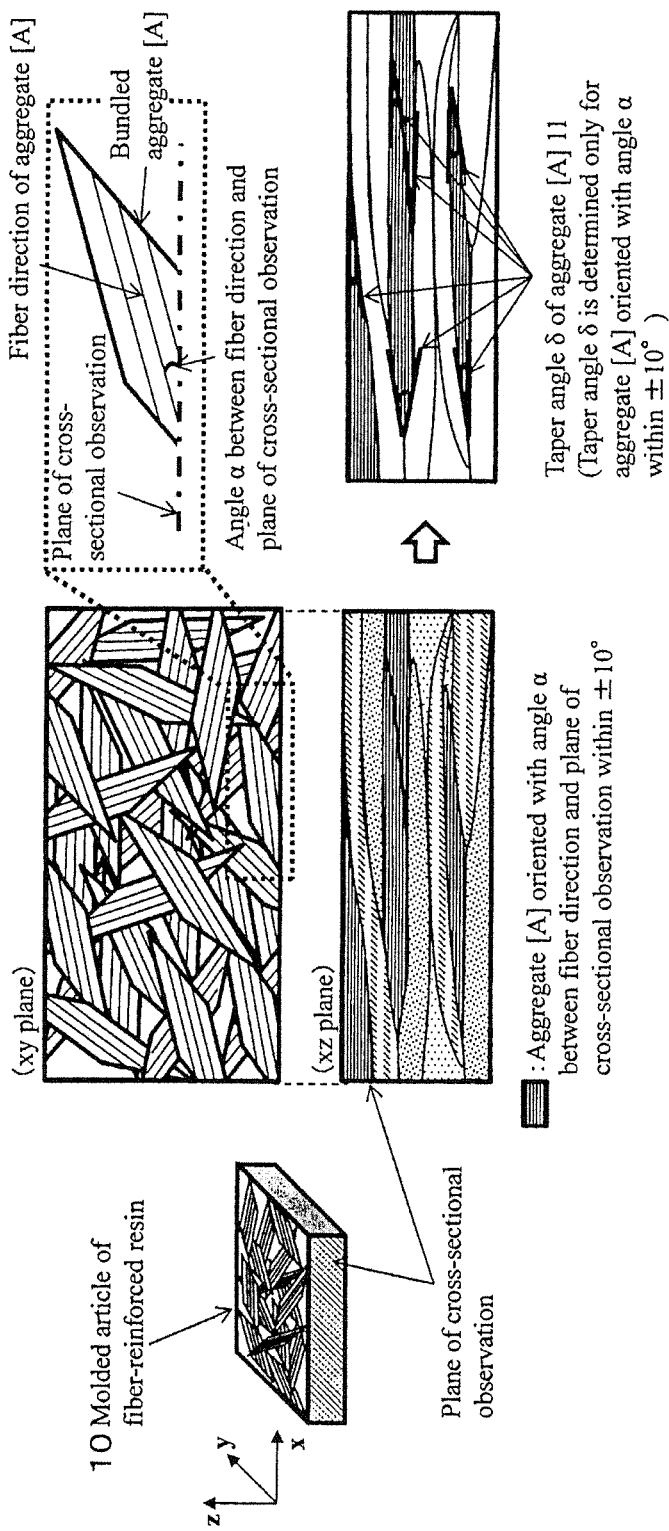
FIG. 2 is an explanatory diagram explaining an angle α between a fiber direction of a bundled aggregate [A] and a plane of cross-sectional observation and a taper angle δ.

It is preferred that cross-sectional observation is carried out in a homogeneous region of the molded article of the fiber-reinforced resin, concretely, a region that is 2 cm or more inward from the end portion, and 80% or more of end portions of bundled aggregates [A], which are oriented with an angle α between a fiber direction and a plane of the cross-sectional observation within ±10°, among the observed bundled aggregates [A], have a taper angle δ of 10° or less. Such an angle α between the fiber direction of the bundled aggregate [A] and the plane of the cross-sectional observation and the taper angle δ are represented, for example, as shown in FIG. 2. As shown in FIG. 2, when planes of the cross-sectional observation are formed with respect to the x, y, and z directions, in the cross-sectional observation plane for the (xy plane) and the cross-sectional observation plane for the (xz plane), the bundled aggregates [A], each in which the fiber direction and the plane of the cross-sectional observation form an angle α, appear as shown in the figure. Among them, with respect to only the bundled aggregates [A] where the angle α between the fiber direction and the plane of the cross-sectional observation is oriented within ±10°, in the illustrated example, with respect to only the bundled aggregates [A] 11 where the angle α in the plane of the cross-sectional observation (xz plane) is within ±10°, the taper angles δ at the end portions of the aggregates [A] 11 are measured, and it is preferred that 80% or more of the end portions of the bundled aggregates [A] 11, which are oriented with the angle α within ±10°, have a taper angle δ of 10° or less (for example, extraction is performed with N=10, of which 8 or more correspond). The fiber direction (fiber orientation direction) in the bundled aggregate [A] can be determined from, for example, the major axis ratio of the observed fiber cross section (the ratio of the major axis to the minor axis), and the larger the angle α is, more the cross section approaches a perfect circle, conversely, smaller the angle α is, that is, as the single fibers of the fiber bundle get closer to parallel to the plane of the cross-sectional observation, it becomes an elliptical shape with a larger major axis. From the major axis ratio, it is possible to determine the angle α. By the condition where most of the end portions of the bundled aggregates [A] are thus tapered such that the taper angle δ is 10° or less, the change in shape at the end portion of bundled aggregate [A] of discontinuous reinforcing fibers in the stacked inner FRP layer is extremely suppressed, the occurrence of stress concentration at the end portions in the lengthwise direction of the fiber bundle [A] is further suppressed, and it becomes possible to exhibit further high mechanical properties in the molded article and further reduce the variation thereof.

Figure 3:
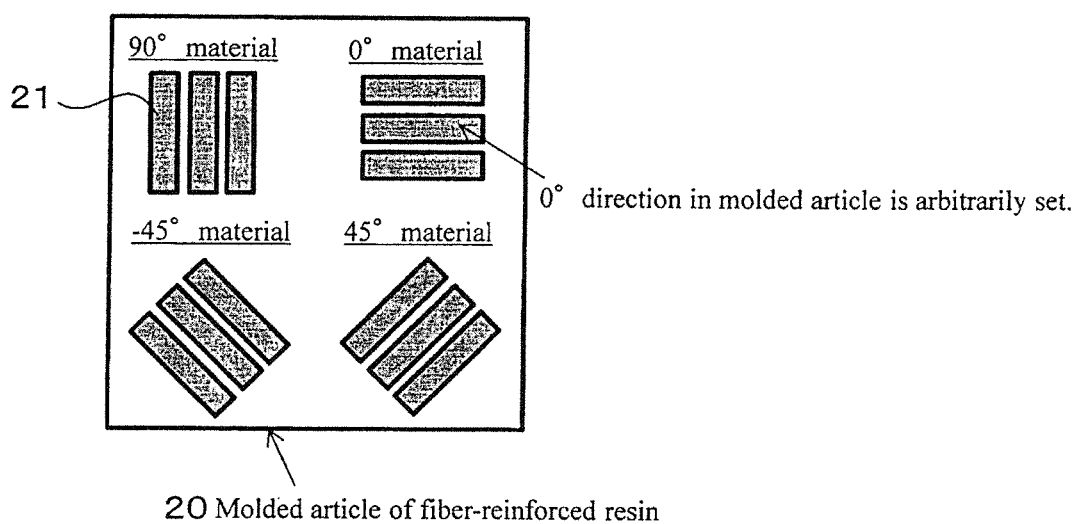
FIG. 3 is an explanatory diagram explaining how to cut out a test piece.

FIG. 3 shows how to cut out a test piece in evaluating, in particular, the mechanical properties of the molded article of the fiber-reinforced resin. As shown in the figure, an arbitrary direction is set to 0° with respect to the molded article of the fiber-reinforced resin 20, and from the molded article of the fiber-reinforced resin 20, test piece 21 are cut out in four directions of 0°, 45°, 90° and −45° and the mechanical properties and CV value of each test piece 21 are measured and calculated. Measurement in each direction is performed, for example, with N=3, and an average value is obtained.

For example, when a flexural modulus is measured as the mechanical properties, it is preferred that an average flexural modulus Eb is obtained, and the average flexural modulus Eb satisfies equation (1):

$$Eb > Vf \times (3/8) \times Ef \times 0.65 \quad (1)$$

Vf: volume content of reinforcing fibers contained in molded article of fiber-reinforced resin
Ef: modulus of reinforcing fibers contained in molded article of fiber-reinforced resin.

By satisfying formula (1), desirable flexural modulus is achieved in the molded article of the fiber-reinforced resin, which makes it possible to exhibit high mechanical properties in the molded article and reduce the variation thereof as aforementioned. Similarly, it is preferred that, when a flexural modulus of each test piece is measured, the CV value of the flexural modulus is 20% or less. Namely, it is preferred that a high flexural modulus can be exhibited and the variation thereof is suppressed. The CV value of the more preferable flexural modulus is 15% or less, more preferably 10% or less.

Further, similarly from the cut-out test piece, it is possible to measure a high flexural strength in the molded article of the fiber-reinforced resin and the CV value thereof, and it is preferred that the CV value of the flexural strength is also 20% or less. Namely, it is preferred that a high flexural strength can be exhibited and the variation thereof is suppressed. The CV value of the more preferable flexural strength is 15% or less, more preferably 10% or less.

In the molded article of the fiber-reinforced resin, with respect to the average number of fibers of the bundled aggregate [A], as aforementioned, it is preferred that the molded article of the fiber-reinforced resin is subjected to ashing treatment, 20 bundled aggregates [A] are selected, and the average number of fibers of the selected bundled aggregates [A] is 6,000 or less. Namely, to make it possible to exhibit high mechanical properties in the molded article and reduce its variation thereof while securing good flowability at the time of molding, it is preferred that the average number of fibers of the bundled aggregate [A] as a structural material of the fiber-reinforced resin molding material used for molding is 6,000 or less.

It is preferred that a specific form of fiber-reinforced resin molding material is used. In particular, it is preferred that the fiber-reinforced resin molding material contains bundled aggregates [A] of discontinuous reinforcing fibers, and the bundled aggregate [A] of discontinuous reinforcing fibers is formed by being cut obliquely to the lengthwise direction of the fiber bundle. In particular, it is preferred that the bundled aggregates [A] is obtained by cutting a partially-separated fiber bundle, prepared by forming separation treatment sections separated into a plurality of bundles and non-separation treatment sections alternately along a lengthwise direction of a fiber bundle comprising a plurality of single fibers, at an angle θ (0°<θ<90°) with respect to the lengthwise direction of the fiber bundle.

With respect to the bundled aggregate [A] of discontinuous reinforcing fibers constituting the fiber-reinforced resin molding material, for example, as shown in FIG. 4(A), by the configuration in that the bundled aggregate [A] 31 is formed by being cut obliquely to the lengthwise direction of the fiber bundle (to the fiber direction of the aggregate [A] in the figure) (being cut at an angle θ (0°<θ<90°) with respect to the lengthwise direction of the fiber bundle), as compared to the bundled aggregate [A] 32 shown in FIG. 4(B) that is cut in the orthogonal direction (θ=90° direction), as understood from the comparison between the vertical sectional shapes 35, 36 of the bundled aggregates [A] 33, 34 each in which after the molding slightly the width is widened and the thickness is reduced, a rapid thickness change of the end portion in the lengthwise direction of the bundled aggregate [A] 33 having been cut obliquely is suppressed, the stress concentration in the molded article can be reduced, and it enables exhibition of higher mechanical properties of the molded article and further reduction of the variation of the mechanical properties.

Then, in particular, it is preferred that the bundled aggregate [A] is formed from the partially-separated fiber bundle, prepared by forming separation treatment sections separated into a plurality of bundles and non-separation treatment sections alternately along a lengthwise direction of a fiber bundle comprising a plurality of single fibers, and it is preferred that the bundled aggregate [A] is formed by being cut at an angle θ (0°<θ<90°) with respect to the lengthwise direction of this partially-separated fiber bundle.

Figure 5:
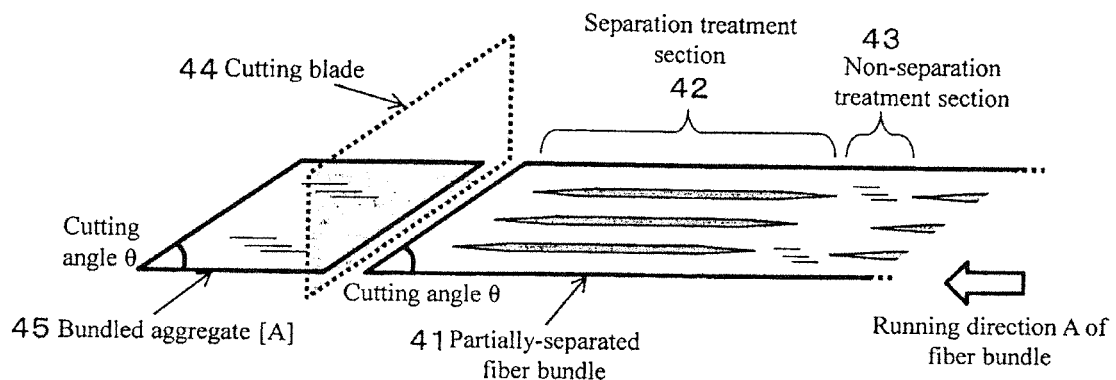
FIG. 5 is a schematic perspective view showing an example of using a partially-separated fiber bundle and cutting it.

With respect to the above-described bundled aggregate [A] formed from a partially-separated fiber bundle, first, in FIG. 5, a partially-separated fiber bundle, prepared by forming separation treatment sections separated into a plurality of bundles and non-separation treatment sections alternately along a lengthwise direction of a fiber bundle comprising a plurality of single fibers, and its cutting, will be explained. As shown in FIG. 5, a partially-separated fiber bundle 41 in which separation treatment sections 42 and non-separation treatment sections 43 are alternately formed along the lengthwise direction of the fiber bundle is run in the direction A, and the fiber bundle 41 is cut by a cutting blade 44 in a direction traversing the fiber bundle 41 to form bundled aggregate [A] 45 of discontinuous reinforcing fibers. At this time, it is cut at an angle θ with respect to the lengthwise direction of the fiber bundle, and in the preferred example, the cutting angle θ is set at an oblique cut of 0°<θ<90°. The preferable range of the angle θ is 0°<θ<45°, more preferably 5°<θ<30°. In such a range, it is possible to achieve both to exhibit high mechanical properties and low variation thereof, and realize a high processability that can suppress cutting mistakes and cut at a desired angle.

Figure 6:
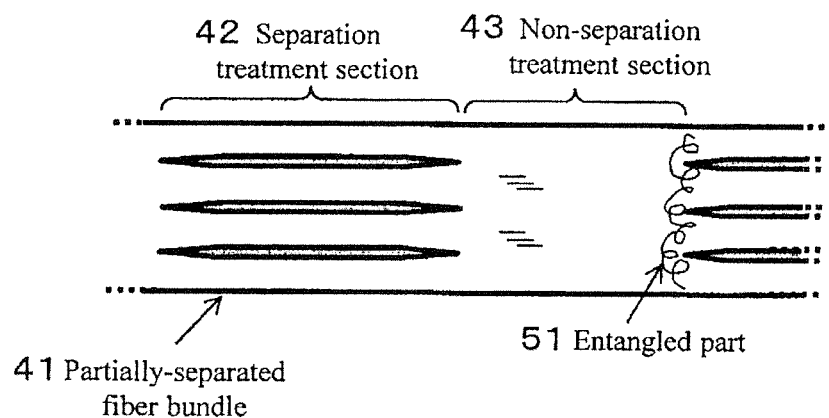
FIG. 6 is a schematic plan view showing an example of a partially-separated fiber bundle when using the partially-separated fiber bundle.
Figure 7:
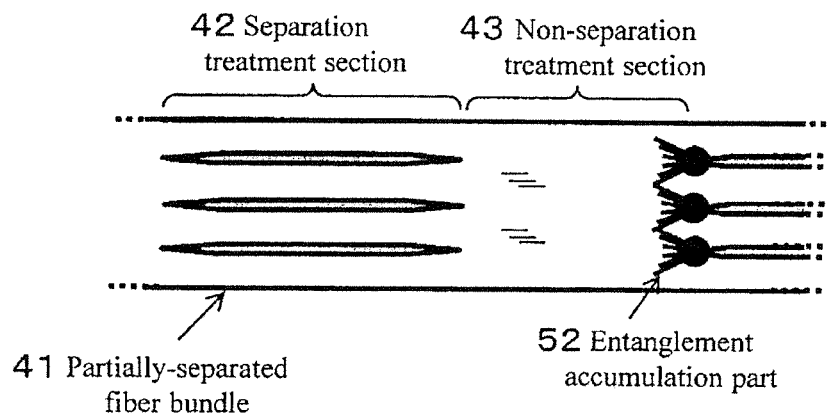
FIG. 7 is a schematic plan view showing another example of a partially-separated fiber bundle when using the partially-separated fiber bundle.

Although the partially-separated fiber bundle 41 before cutting basically has a form in which separation treatment sections 42 and non-separation treatment sections 43 as shown in FIG. 5 are alternately formed along the lengthwise direction of the fiber bundle, as shown in FIG. 6 or 7, an example, wherein an entangled part 51 in which single fibers are tangled with each other and/or an entanglement accumulation part 52 in which the entangled parts are accumulated in at least one end portion of at least one separation treatment section 42, can be also employed.

Figure 8:
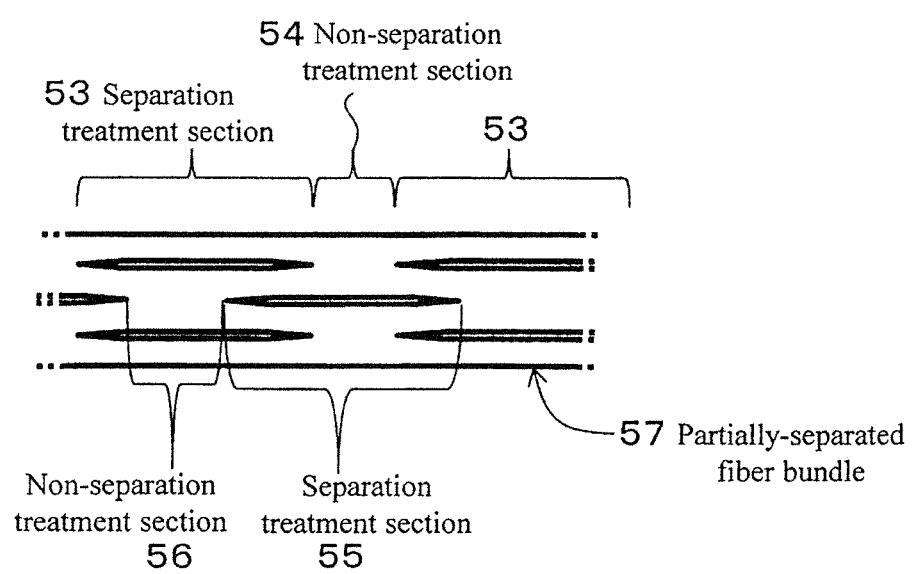
FIG. 8 is a schematic plan view showing a further example of a partially-separated fiber bundle when using the partially-separated fiber bundle.

Further, as shown in FIG. 8, a partially-separated fiber bundle 57 according to an example, which comprises a combination of a formation in which the separation treatment sections 53 and the non-separation treatment sections 54 are alternately formed along the lengthwise direction of the fiber bundle and a formation in which the separation treatment sections 55 and the non-separation treatment sections 56 are alternately formed along the lengthwise direction of the fiber bundle, and wherein one separation treatment sections 55 are formed to extend over the other non-separation treatment sections 54, is also included in the partially-separated fiber bundle in the present invention.

The partially-separated fiber bundle as described above is formed, for example, as shown in FIG. 9, although it is not particularly limited. FIG. 9 is a schematic plan view (A) and a schematic side view (B) showing an example in which a separation means 61 is pierced into a running fiber bundle 60. The running direction A of the fiber bundle (the arrow) in the figure is the lengthwise direction of the fiber bundle 60, indicating that the fiber bundle 60 is continuously supplied from a fiber bundle supply device (not shown). The separation means 61 has a protrusion 62 having a protruding shape which is easy to be pierced into the fiber bundle 60, is pierced into the running fiber bundle 60, and generates separation treatment sections 63 substantially parallel to the lengthwise direction of the fiber bundle 60. Depending on the number of fiber bundles to be separated, it is also possible to simultaneously use a plurality of separation means 61. It is possible to arbitrarily arrange a plurality of protrusions 62 by a manner such as arranging a plurality of separation means 61 in parallel, by turns, or by shifting the phase.

When the fiber bundle 60 comprising a plurality of single fibers is divided into separated bundles having a lesser number of single fibers by the separation means 61, there is a possibility that, because a plurality of single fibers are not aligned substantially in the fiber bundle 60, but in single fiber level there are many portions where single fibers are tangled with each other, entangled parts 65, each in which single fibers are tangled with each other, may be formed in the vicinity of contact part 64 in the separation treatment. "Forming the entangled part 65" means, for example, forming (moving) the entanglement of single fibers having existed beforehand in the separation treatment sections in the contact part 64 by the separation means 61, forming (manufacturing) an aggregate newly entangled with single fibers by the separation means 61, or the like.

After generating separation treatment sections 63 in an arbitrary range, the separation means 61 is pulled out from the fiber bundle 60. By this pulling out, separation treatment sections 63 subjected to the separation treatment are created, and at the same time entanglement accumulation parts 66 accumulated with entangled parts 65 are created. Further, fluffs generated from the fiber bundle during the separation treatment may form a fluff accumulation 67 near the entanglement accumulation part 66 at the time of the separation treatment.

Thereafter, by piercing the separation means 61 again into the fiber bundle 60, non-separation treatment sections 68 are created.

In the fiber bundle of reinforcing fibers, the kind of fibers is not particularly limited as long as it is a fiber bundle comprising a plurality of single fibers. In particular, at least one selected from the group consisting of carbon fibers, aramid fibers and glass fibers is preferred. These may be used alone, or two or more of them can be used in combination. In particular, carbon fibers are particularly preferable because they can provide a lightweight composite material excellent in strength. As the carbon fibers, any of PAN type and pitch type may be used, and the average fiber diameter thereof is preferably 3 to 12 μm, more preferably 6 to 9 μm.

In carbon fibers, usually, a fiber bundle in which 3,000 to 60,000 single fibers made of continuous fibers are bundled is supplied as a yarn wound body (package) wound on a bobbin. Although the fiber bundle is preferred to be untwisted, a strand with twists can also be used, and even if twisting occurs during conveyance, it can be applied. There is no restriction also on the number of single fibers, and when using so-called large tow with a large number of single fibers, since the price per unit weight of fiber bundle is inexpensive, as the number of single fibers is larger, the cost of the final product can preferably be reduced. Further, as a large tow, a so-called doubling form in which fiber bundles are wound together in a form of one bundle may be used.

When the reinforcing fibers as described above are used, it is preferred that they are surface treated for the purpose of improving the adhesiveness to a matrix resin [M] and the like. As the method for the surface treatment, there are electrolytic treatment, ozone treatment, ultraviolet treatment and the like. Further, a sizing agent may also be added for the purpose of preventing fluffing of reinforcing fibers, improving convergence of fiber bundle, improving adhesiveness with matrix resin [M] and the like. As the sizing agent, although not particularly limited, a compound having a functional group such as an epoxy group, a urethane group, an amino group, a carboxyl group and the like can be used, and one type thereof may be used alone or two or more types thereof may be used together in combination.

The fiber bundle is preferably in a state of being bundled in advance. The state being bundled in advance means, for example, a state bundled due to entanglement of single fibers constituting the fiber bundle with each other, a state bundled by a sizing agent applied to the fiber bundle, and a state bundled due to twists being contained in the production process of the fiber bundle.

Figure 11:
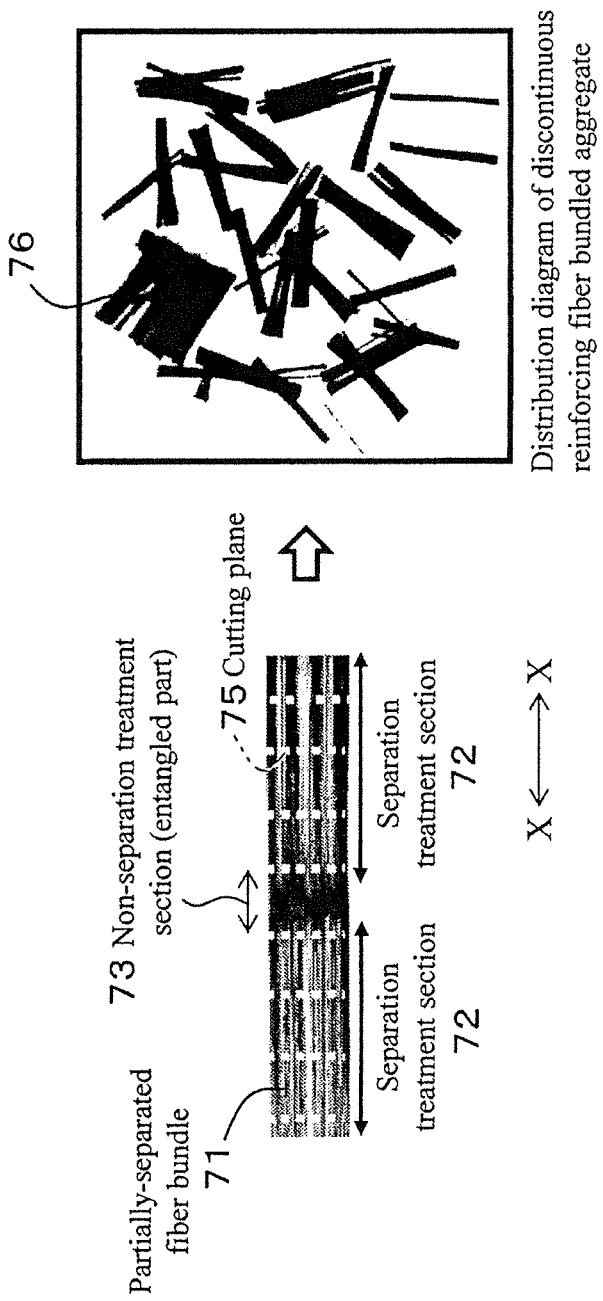
FIG. 11 is a schematic plan view of a partially-separated fiber bundle showing an example when the fiber bundle is orthogonally cut.

Next, in FIG. 10, the basic technical concept employing the oblique cutting of a partially-separated fiber bundle will be explained as compared to FIG. 11 employing the orthogonal cutting of a partially-separated fiber bundle. In FIGS. 10 and 11, symbol 71 denotes a partially-separated fiber bundle wherein along the lengthwise direction of a fiber bundle composed of a plurality of single fibers, separation treatment sections 72 each of which is separated into a plurality of bundles and non-separation treatment sections 73 including the aforementioned entangled part and the like are alternately formed. In FIG. 11, the cutting plane 75 for the partially-separated fiber bundle 71 is set in a direction (90° direction) orthogonal to the lengthwise direction X-X of the fiber bundle, whereas in FIG. 10, the angle θ of the cutting plane 74 with respect to the lengthwise direction X-X of the fiber bundle is set at an angle θ (0°<θ<90°) in an oblique direction.

Then, when burning off a matrix resin [M] from a molded article molded by randomly dispersing a fiber-reinforced resin molding material containing bundled aggregates [A] of discontinuous reinforcing fibers obtained by the above-described cutting and the matrix resin [M], heating and pressing, and leaving only bundled aggregates [A] of discontinuous reinforcing fibers to observe them as a plan view, the distribution diagrams of discontinuous reinforcing fiber bundled aggregates, for example, as exemplified in the right sides of FIGS. 10 and 11, are obtained. In the distribution diagram shown in FIG. 11, bundled aggregates 76, which are formed by cutting at both sides of non-separation treatment sections 73 including mainly entangled parts etc. at cutting planes 75 and in which the end portions in the lengthwise direction of the fiber bundle are relatively wide and formed as end portions extending in the direction orthogonal to the lengthwise direction of the fiber bundle, are left substantially in forms similar to their original forms. In such end portions of bundled aggregates 76, a stress concentration is liable to occur, and it causes a decrease in the mechanical properties of the molded article and its variation. On the other hand, in the distribution diagram shown in FIG. 10, there is no such bundled aggregate 76 in which stress concentration is liable to occur and, for example, even in bundled aggregates 77 formed by cutting obliquely including non-separation treatment sections 73 including entangled parts, etc., each bundled aggregate 77 has a relatively narrow width and becomes narrower as it goes to the end portion, and it forms into a bundled aggregate that does not have an end portion where stress concentration is liable to occur as in the bundled aggregate 76. Therefore, it becomes possible to improve the mechanical properties of the molded article and reduce the variation of the mechanical properties.

The bundled aggregate [A] of discontinuous reinforcing fibers formed as described above can have a formation, for example, wherein the bundled aggregate [A] contains at least one kind of aggregate selected from:

a separated bundle aggregate [a] divided into an arbitrary number of bundles by separation treatment;

a joined bundle aggregate [b] in which single fibers of the fiber bundle are joined to each other by the non-separation treatment section and/or the entangled part and/or the entanglement accumulation part; and a joined cut aggregate [c] in which the non-separation treatment section and/or the entangled part and/or the entanglement accumulation part intersects with a cutting plane of the partially-separated fiber bundle at the time of being cut, and the joining of single fibers of the fiber bundle to each other is cut off at the intersected part.

Figure 12:
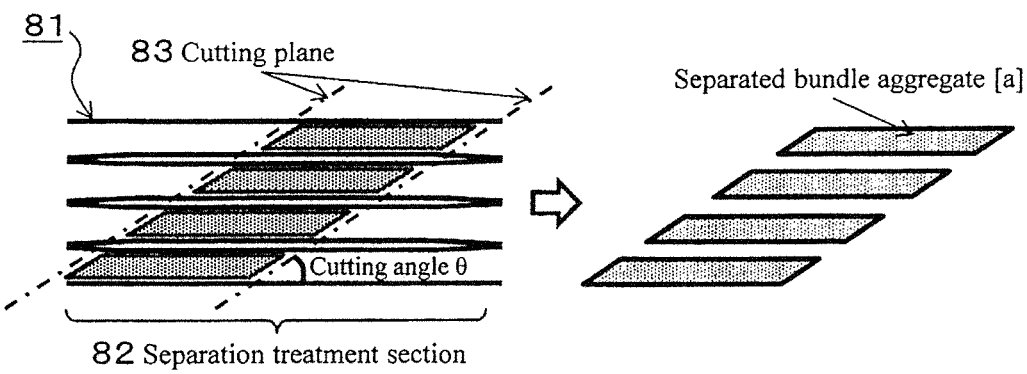
FIG. 12 is a schematic plan view showing an example of a method of manufacturing a separated bundle aggregate [a] when using a partially-separated fiber bundle.

The above-described separated bundle aggregate [a] is, for example, as shown in FIG. 12, formed as a separated bundle aggregate [a] having a small width and a predetermined length at a formation of an arbitrary plural formation by being cut at cutting planes 83 oblique with respect to the lengthwise direction of the fiber bundle at a cutting angle θ (0°<θ<90°) within the separation treatment section 82 of the partially-separated fiber bundle 81.

Figure 13:
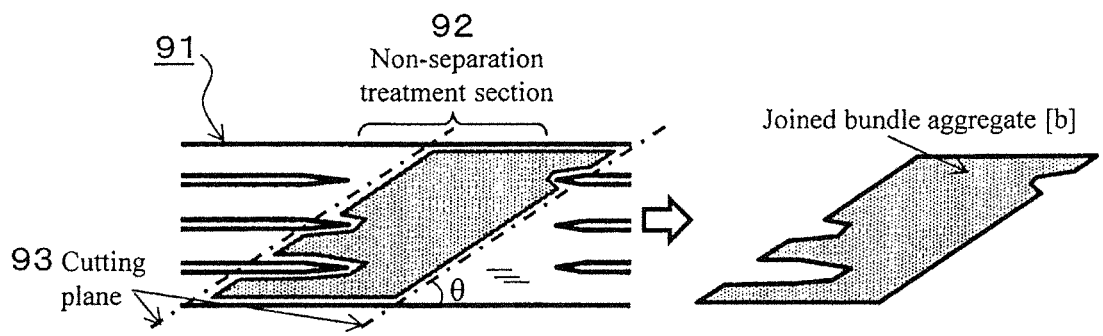
FIG. 13 is a schematic plan view showing an example of a method of manufacturing a joined bundle aggregate [b] when using a partially-separated fiber bundle.
Figure 14:
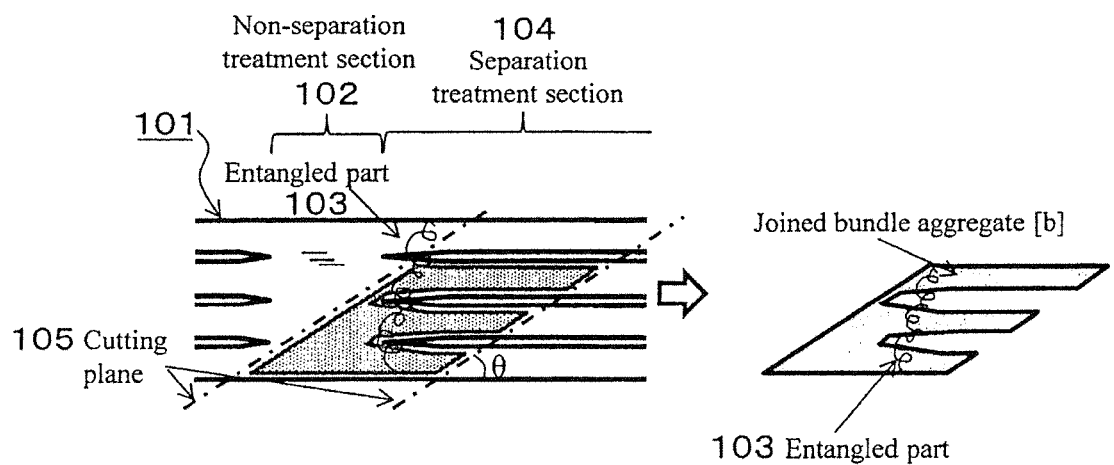
FIG. 14 is a schematic plan view showing another example of a method of manufacturing a joined bundle aggregate [b] when using a partially-separated fiber bundle.
Figure 15:
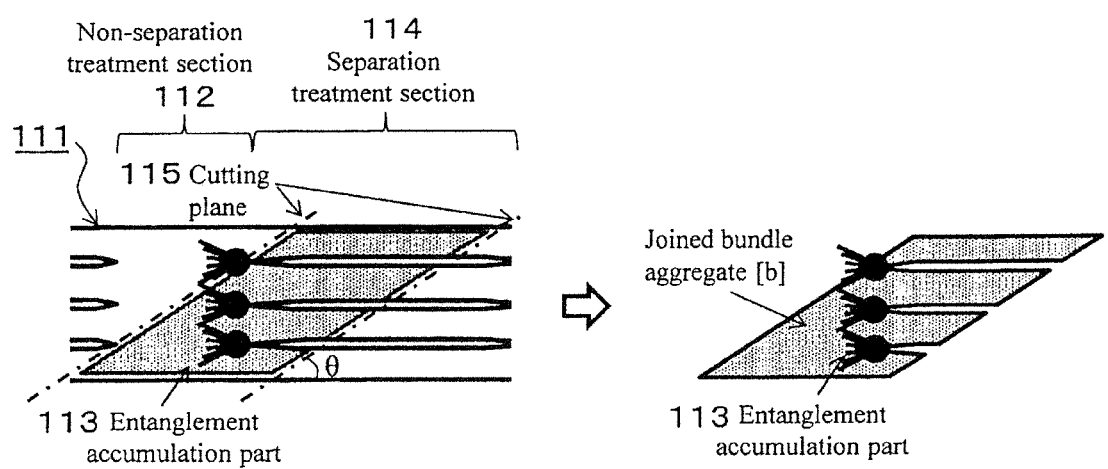
FIG. 15 is a schematic plan view showing a further example of a method of manufacturing a joined bundle aggregate [b] when using a partially-separated fiber bundle.

As an example of the above-described joined bundle aggregate [b], the joined bundle aggregate [b] is, for example, as shown in FIG. 13, formed as a joined bundle aggregate [b] such as one made with an incision at an end portion in the lengthwise direction of the fiber bundle, by being cut at cutting planes 93 oblique with respect to the lengthwise direction of the fiber bundle at a cutting angle θ (0°<θ<90°) mainly within the non-separation treatment section 92 of the partially-separated fiber bundle 91. Alternatively, the joined bundle aggregate [b] is, for example, as shown in FIG. 14, formed as a joined bundle aggregate [b] such as one made with a deep incision at an end portion in the lengthwise direction of the fiber bundle and having an entangled part 103, by being cut at cutting planes 105 oblique with respect to the lengthwise direction of the fiber bundle at a cutting angle θ (0°<θ<90°) over the non-separation treatment section 102 and the separation treatment section 104 having the entangled part 103 at the end portion of the partially-separated fiber bundle 101. Alternatively, the joined bundle aggregate [b] is, for example, as shown in FIG. 15, formed as a joined bundle aggregate [b] such as one made with a deep incision at an end portion in the lengthwise direction of the fiber bundle and having an entanglement accumulation part 113, by being cut at cutting planes 115 oblique with respect to the lengthwise direction of the fiber bundle at a cutting angle θ (0°<θ<90°) over the non-separation treatment section 112 and the separation treatment section 114 having the entanglement accumulation part 113 at the end portion of the partially-separated fiber bundle 111.

Figure 16:
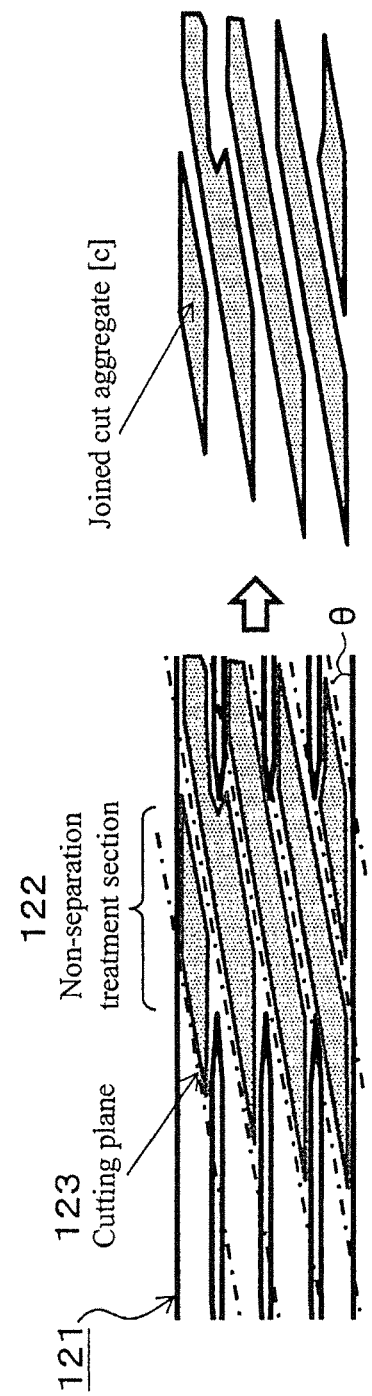
FIG. 16 is a schematic plan view showing an example of a method of manufacturing a joined cut aggregate [c] when using a partially-separated fiber bundle.

Further, for example, as shown in FIG. 16, the above-described joined cut aggregate [c] is formed as a joined cut aggregate [c] small in width and having a relatively large average fiber bundle length in which the end portion in the lengthwise direction is further narrower in width, by being cut at cutting planes 123 oblique with respect to the lengthwise direction of the fiber bundle at a cutting angle θ (0°<θ<90°) to include mainly the non-separation treatment sections 122 of the partially-separated fiber bundle 121 or obliquely traverse the non-separation treatment sections 122 over the entire length thereof. In the illustrated example, the non-separation treatment sections 122 and the cutting plane 123 at the time of cutting of the partially-separated fiber bundle 121 intersect each other, and the joining of single fibers of the fiber bundle 121 to each other is cut off at the intersected part.

In the above-described joined cut aggregate [c], since the average length of the fiber bundle becomes relatively long, at the time of cutting of the fiber bundle or at the time of scattering the aggregates, there is a possibility that cracks are naturally generated in the fiber bundle even in the non-separation treatment section and aggregates having a smaller number of single fibers may be formed. Such aggregates made into smaller bundles are also included in the above-described joined cut aggregate [c].

The bundled aggregate [A] of discontinuous reinforcing fibers can employ an example containing at least one kind of aggregate selected from the above-described separated bundle aggregate [a], joined bundle aggregate [b] and joined cut aggregate [c]. In the above-described bundled aggregate [A], it is preferred that the content of the joined bundle aggregates [b] is 0 to 15%, from the viewpoint of exhibiting more excellent mechanical properties and lower variation thereof. The content means a frequency rate of the joined bundle aggregate [b] occupied in the bundled aggregate [A]. Namely, when the total number of bundled aggregates [A] is referred as N(A) and the number of joined bundle aggregates [b] contained therein is referred as N(b), it is expressed by equation (2):

$$\{N(b)/N(A)\}\times 100 \qquad (2).$$

Figure 17:
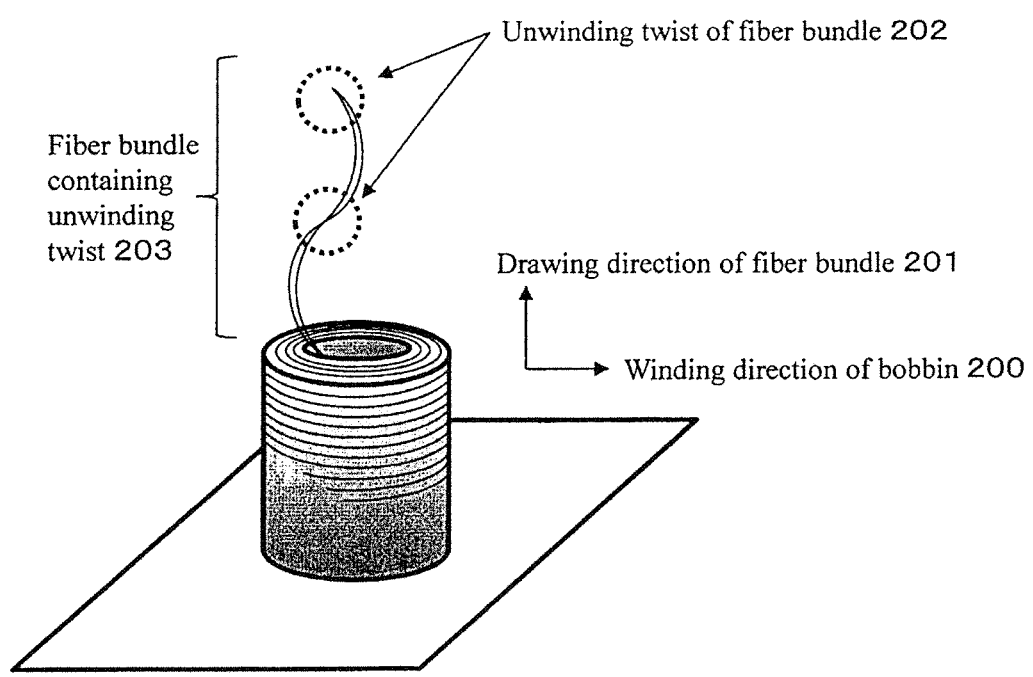
FIG. 17 is a schematic perspective view showing an example of the inside pull manner.

When cutting the fiber bundle in order to obtain the bundled aggregate [A], it is preferred to feed the fiber bundle unwound by an inside pull manner to the cutting process. The inside pull manner means a method in which a bobbin wound with fiber bundles around a winding core (a paper tube is generally used) is placed on a creel, differently from a method in which a fiber bundle is unwound from the fiber bundle end on the outer side of the bobbin, the winding core of the bobbin is removed, and as shown in FIG. 17, at a state being installed perpendicularly to the winding direction 200 of the bobbin, the fiber bundle end located on the inner side of the bobbin is drawn out perpendicularly to the winding direction of the bobbin.

According to the above-described inside pull manner, when the partially-separated fiber bundle is subjected to the cutting process, by connecting the fiber bundle end on the outer side of the bobbin and the fiber bundle end on the inner side of the other bobbin from which the winding core is removed similarly, the cutting processing can be carried out continuously for a long time and, therefore, such a method is preferred. In particular, in the above-described inside pull manner, it is possible to perform a work of connecting yarns in parallel with the cutting processing, thereby improving the productivity and, therefore, such a method is preferred. Further, since abrasion against the bobbin which is generated when the unwound fiber bundle traverses on the bobbin at the time of unwinding the fiber bundle disappears, it is preferred also from the viewpoint that it is possible to suppress occurrence of abrasion fluffs.

On the other hand, in the above-described inside pull manner, since the fiber bundle is drawn out perpendicularly to the winding direction (drawing direction of fiber bundle 201), a unwinding twist 202 may be generated in the fiber bundle. When cutting the partially-separated fiber bundle 203 containing such a unwinding twist, the fiber length of the bundled aggregate [A] obtained may become nonuniform depending upon the way of twisting or the cutting plane of the partially-separated fiber bundle may not be linear, but none of them is at a level that damages the desired effect, and substantially they can be handled in the same manner as a case of cutting a fiber bundle having no twist.

Thus, by having a specified bundled aggregate [A] of discontinuous reinforcing fibers formed by cutting a partially-separated fiber bundle, in which separation treatment sections and non-separation treatment sections are alternately formed, obliquely with respect to the lengthwise direction of the fiber bundle, it is possible to realize extremely high mechanical properties (strength, modulus of elasticity) when made into a molded article, and it is possible to suppress the variation of the mechanical properties.

The molded article of the fiber-reinforced resin is a molded article of a fiber-reinforced resin comprising at least a bundled aggregate [A] of discontinuous reinforcing fibers, desirably a bundled aggregate [A] having a preferable form as described above and a matrix resin [M], the average layer thickness h in this molded article of the fiber-reinforced resin is 100 μm or less and the CV value of the average layer thickness h is 40% or less, and such a molded article of a fiber-reinforced resin is manufactured, as aforementioned, by the following compression molding method.

Namely, it is a compression molding method for molding a molded article of a fiber-reinforced resin, wherein with respect to a fiber-reinforced resin molding material before molding and a molded article of a fiber-reinforced resin after molding, the compression molding method satisfies feature 1:

1: in the fiber-reinforced resin molding material, the number of layers in the thickness direction is measured at each of 20 points defined in the material in-plane direction and the average number of layers na is calculated, and after the molded article of the fiber-reinforced resin after molding is subjected to an ashing treatment, the number of layers in the thickness direction is measured at each of 20 points defined in the article in-plane direction after the ashing treatment and the average number of layers nb is calculated, and the ratio nb/na of nb to na is 1.2 or more.

By employing such a compression molding method, as aforementioned, the thickness of the FRP inner layer when it becomes the FRP after molding (that is, the thickness of the fiber bundle after molding in the molded article of the fiber-reinforced resin) is larger as the average thickness than the thickness of the original fiber bundle (that is, the layer thickness in the fiber-reinforced resin molding material before molding) (pseudo spreading effect is exhibited), but by setting nb/na at 1.2 or more, the average layer thickness h in the molded article of the fiber-reinforced resin can be easily reduced, thereby making it possible to more reliably achieve the improvement of the mechanical properties in the molded article and the reduction effect of the variation thereof.

EXAMPLES

Next, examples and comparative examples will be explained. It should be noted that this disclosure is not limited in any way by the examples and comparative examples.
Material
Fiber Bundle [A-1]:

A continuous carbon fiber bundle having a fiber diameter of 7.2 μm, a flexural modulus of 240 GPa, and a number of single fibers of 50,000 ("Panex 35 (registered trademark)", supplied by ZOLTEK Co., Ltd.) was used.
Matrix Resin [M-1]:

A resin compound prepared by sufficiently mixing and stirring 100 parts by weight of a vinyl ester resin ("DELAKEN (registered trademark) 790", supplied by Dow Chemical Co., Ltd.), 1 part by weight of tert-butyl peroxybenzoate ("Perbutyl (registered trademark) Z", supplied by NOF CORPORATION) as a curing agent, 4 parts by weight of magnesium oxide (MgO #40, supplied by Kyowa Chemical Industry Co., Ltd.) as a thickener, and 2 parts by weight of zinc stearate (SZ-2000, supplied by Sakai Chemical Industry Co., Ltd.) as an internal release agent.
Matrix Resin [M-2]:

A polyamide resin ("CM 1001" supplied by Toray Industries, Inc.) was used.

Reference Example 1: Average Layer Thickness h in Molded Article of Fiber-Reinforced Resin and Method for Calculating its CV Value A sample of 120×100×1.6 mm was cut out from a molded article of a fiber-reinforced resin, a total of 20 points of 5 points in the lengthwise direction and 4 points in the short side direction were selected at intervals of 20 mm, and after measuring the thickness of the molded article, the sample was subjected to ashing treatment by heating it in a furnace at 600° C. for 1 hour to remove the resin. Subsequently, the number of layers n1 of bundled aggregates [A] remaining in the thickness direction was measured in the in-plane direction of the sample from which the resin had been removed at the above-described prescribed 20 points, and it was divided by the thickness of the molded article before ashing treatment, and from the obtained value, the average layer thickness h and the CV value were calculated.

Reference Example 2: Method of Calculating the Ratio 1/L of Average Fiber Bundle Length 1 to Average Fiber Length L of Bundled Aggregate [A]

A sample of 100×100×1.6 mm was cut out from a molded article of a fiber-reinforced resin, and the sample was subjected to ashing treatment by heating it in a furnace at 600° C. for 1 hour to remove the resin. Subsequently, 20 samples of bundled aggregate [A] were selected from the samples from which the resin had been removed, and the average fiber bundle length 1 and the average fiber length L of the selected bundled aggregates [A] were measured with calipers to calculate the value of 1/L.

Reference Example 3: Method of Calculating the Ratio w/h of Fiber Bundle Width w to Average Layer Thickness h of Bundled Aggregate [A]

With respect to the 20 bundled aggregates [A] selected in Reference Example 2, microscopic observation was performed and the projection area S of each of the bundled aggregates [A] was measured. The flatness rate w/h was calculated from the width of fiber bundle w obtained by dividing the obtained projection area S by the average fiber length L and the average layer thickness h calculated by Reference Example 1.

Reference Example 4: Method of Calculating Taper Angle δ at the End Portion of Bundled Aggregate [A]

A sample of 100×25×1.6 mm was cut out from a molded article of a fiber-reinforced resin, a sample for cross-sectional observation was obtained by polishing the end face, and cross-sectional observation was carried out by microscope. Among the aggregates [A] observed by cross-sectional observation, ten points of the end portions of the bundled aggregates [A] where the angle α between the fiber direction and the plane of cross-sectional observation is oriented within ±10° are extracted, and for each of them, the taper angle δ was measured. When 8 points among 10 points were 10° or less was determined to be A rank, and when the points of 10° or less were less than 8 points was determined to be x.

Reference Example 5: Classification of Bundled Aggregate [A] and Calculation Method of Content of Joined Bundle Aggregate [b]

A sample of 100×100×1.6 mm was cut out from a molded article of a fiber-reinforced resin, and the sample was subjected to ashing treatment by heating it in a furnace at 600° C. for 1 hour to remove the resin. Subsequently, 400 of bundled aggregates [A] were taken out from the sample removed with the resin using tweezers, and they were classified into separated bundle aggregates [a], joined bundle aggregates [b] and joined cut aggregates [c].
Separated Bundle Aggregate [a]:
In a partially-separated fiber bundle, the small bundles divided originating from the applied separation treatment were determined as separated bundle aggregates [a].
Joined Bundle Aggregate [b]:
In a partially-separated fiber bundle, one capable of being judged to be "in a shape joined with bundles with each other" by inter-bundle joining factors such as non-separation treatment section, entangled part, entanglement accumulation part, etc. was determined as joined bundle aggregate [b]. The term "a shape joined with bundles with each other" means a state where when bundled aggregate s[A] are lifted using tweezers, at least two bundles of the bundled aggregates [A] are simultaneously lifted, and even if vibrated softly, they do not separate into individual bundles.
Joined Cut Aggregate [c]:
In a partially-separated fiber bundle, one having a trace divided by cutting inter-bundle joining factors such as non-separation treatment section, entangled part, entanglement accumulation part, etc., or one capable of being judged to be made into a small piece by natural thread splitting in the process after being cut, was determined as joined cut aggregate [c].
Furthermore, the content of joined bundle aggregates [b] in a fiber-reinforced resin molding material was calculated from the total number of joined bundle aggregates [b] classified as described above.

Reference Example 6: Compression Molding Method of Molded Article of Fiber-Reinforced Resin With the above-described fiber-reinforced resin molding material, after heating at 600° C.×1 hour in a furnace to remove the resin at 20 points defined in the in-plane direction of the material, the number of layers in the thickness direction of each point was measured to calculate the average number of layers na. Next, the same fiber-reinforced resin molding material was placed at the central portion in a mold using a mold No. 1 capable of manufacturing a flat plate (at a charge rate of 50%), and thereafter, it was cured under a pressure of 10 MPa by a pressurizing type press machine at a condition of a temperature of about 140° C. for 5 minutes to obtain a flat plate of 300×400×1.6 mm. The obtained molded article was subjected to ashing treatment by heating it in a furnace at 600° C. for 1 hour similarly to in the manner aforementioned, and then, for 20 points defined in the in-plane direction, the number of layers in the thickness direction of each point was measured to calculate the average number of layers nb. The ratio nb/na was determined from these values of na and nb.

Reference Example 7: Flexural Test Method of Molded Article of Fiber-Reinforced Resin From the flat plate of 300×400×1.6 mm obtained in the same manner as in Reference Example 6, the lengthwise direction of the flat plate was set as 0° and from each of the four directions of 0°, 45°, 90°, and −45° of the obtained flat plate, three pieces (total of 12 pieces) each having a size of 100×25×1.6 mm were cut out, and the measurement was carried out in accordance with JIS K 7074 (1988).

Reference Example 8: Volume Content Vf of Reinforcing Fibers in Molded Article of Fiber-Reinforced Resin A sample of 50 mm×50 mm was cut from a molded article of a fiber-reinforced resin, and the weight of the sample was measured (Wa). Thereafter, the sample was heated in a furnace at 600° C. for 1 hour to remove the resin, and the weight of only reinforcing fibers contained in the molded article was measured (Wb). From these values of Wa and Wb, the weight content Wf of the fibers in the molded article of the fiber-reinforced resin was calculated from equation (3), and Vf was calculated from the specific gravities of the reinforcing fibers and the matrix resin:

$$Wf=Wb/Wa\times 100 \qquad (3).$$

Example 1

The fiber bundle [A-1] was unwound at a constant speed of 10 m/min using a winder, passed through a vibration widening roll vibrating in its axial direction at 10 Hz, and after a widening treatment was applied, it was passed through a width regulating roll of 60 mm in width to obtain a widened fiber bundle widened to 60 mm in width. For the obtained widened fiber bundle, a separation treatment means was prepared in which iron plates for separation treatment each having a protruding shape with a thickness of 0.2 mm, a width of 3 mm and a height of 20 mm were arranged in parallel to each other at equal intervals of 3.5 mm with respect to the width direction of the reinforcing fiber bundle. This separation treatment means was intermittently pierced into and pulled out from the widened fiber bundle to obtain a partially-separated fiber bundle. At this time, the separation treatment means was pierced into the widened fiber bundle running at a constant speed of 10 m/min for 3 seconds to create a separation treatment section, pulled out therefrom in 0.2 second, and the operation of piercing again was repeated. Further, in the obtained partially-separated fiber bundle, the fiber bundle was divided into 17 parts in the width direction in the separation treatment section, and in at least one end portion of at least one separation treatment section, an entanglement accumulation part, in which entangled parts each tangled with single fibers were accumulated, was present. When the partially-separated fiber bundle was manufactured by 1,500 m, the twists of the fibers existing in the fiber bundle passed through in the running direction when pulling out and piercing the separation treatment means without causing yarn breakage and winding at all, and the separation treatment could be carried out with the stable width.

The obtained partially-separated fiber bundle was installed in the creel, unwound from the end of the fiber bundle on the outer side of the bobbin, and inserted continuously into a rotary cutter whose cutting blade was inclined at an angle of 15° with respect to the lengthwise direction of the fiber bundle to cut the fiber bundle, and the bundled aggregate [A] of discontinuous reinforcing fibers was obtained. At this time, the cutting interval was adjusted to 3.2 mm in advance so that it could be cut to a fiber length of 12.5 mm. Subsequently to the above-described cutting process, a discontinuous fiber nonwoven fabric with fiber orientation isotropic was obtained by scattering the bundled aggregates [A] to be uniformly dispersed. The areal weight of the obtained discontinuous fiber nonwoven fabric was 1 kg/m$^2$.

The matrix resin [M-1] was uniformly applied to respective two sheets of polypropylene release films using a doctor blade to make two resin sheets. A sheet-like fiber-reinforced resin molding material was obtained by nipping the above-described obtained discontinuous fiber nonwoven fabric with these two resin sheets and impregnating the resin into the nonwoven fabric by a roller. At this time, the amount of resin application was adjusted at the stage of manufacturing the resin sheets so that the weight content of the reinforcing fibers of the fiber-reinforced resin molding material became 47%.

With respect to the obtained fiber-reinforced resin molding material, when the compression molding of a flat plate was carried out by the method of Reference Example 6, obtained was a fiber-reinforced molded article having a value of nb/na of 1.2. For the obtained fiber-reinforced molded article, various evaluations were carried out by the methods described in Reference Examples 1 to 5, 7 and 8. Vf of the obtained fiber-reinforced molded article was 37%, and an elastic modulus exceeding the value of Vf×(3/8)× Ef×0.65 could be confirmed. Other evaluation results are shown in Table 1.

Example 2

The evaluation was carried out similarly to Example 1 other than a condition where the inclination of the cutting blade of the rotary cutter was adjusted and the cutting interval was adjusted to 6.2 mm so that the cutting angle of the fiber bundle was 30° and the fiber length was 12.5 mm. The series of evaluation results obtained are shown in Table 1.

Example 3

The evaluation was carried out similarly to Example 1 other than a condition where the inclination of the cutting blade of the rotary cutter was adjusted and the cutting interval was adjusted to 8.8 mm so that the cutting angle of the fiber bundle was 45° and the fiber length was 12.5 mm. The series of evaluation results obtained are shown in Table 1.

Example 4

The evaluation was carried out similarly to Example 1 other than a condition where the matrix resin [M-2] was used, the number of division of the fiber bundle when manufacturing a partially-separated fiber bundle was set at 50 parts, and the compression molding was carried out using a laminate prepared by alternately laminating a discontinuous fiber nonwoven fabric obtained by cutting the fiber bundle at an angle of 15° and a fiber length of 12.5 mm and a matrix resin [M-2] in the form of a film. The series of evaluation results obtained are shown in Table 1.

Example 5

The evaluation was carried out similarly to Example 1 other than a condition where when unwinding the fiber bundle in order to insert it into the rotary cutter, the paper tube on which the fiber bundle was wound was removed, and the fiber bundle was unwound in the inside pull manner in which the fiber bundle was drawn from the end portion of the fiber bundle at the inner side of the bobbin. At this time, a small amount of bundled aggregates [A] obtained by cutting the partially-separated fiber bundle was sampled at the time of scattering the bundled aggregates and the fiber length thereof was confirmed and, as a result, although the samples got out from 12.5 mm in fiber length were observed, the ratio thereof was small, and it was determined that they were cut substantially at the aimed fiber length. The series of evaluation results obtained are shown in Table 1.

It could be confirmed that in Examples 1 to 5, excellent mechanical properties (flexural strength, elastic modulus) and low variation (for example, low CV value of flexural modulus) were both exhibited.

TABLE 1

|  |  |  | Example | | | | |
| --- | --- | --- | --- | --- | --- | --- | --- |
|  |  | Unit | 1 | 2 | 3 | 4 | 5 |
| Used raw material | Reinforcing fiber | — | [A-1] | [A-1] | [A-1] | [A-1] | [A-1] |
|  | Matrix resin | — | [M-1] | [M-1] | [M-1] | [M-2] | [M-1] |
| Molded article | Cutting angle θ of aggregate [A] | ° | 15 | 30 | 45 | 15 | 15 |
|  | Average layer thickness h | μm | 88 | 87 | 90 | 95 | 89 |
|  | CV value of average layer thickness h | % | 18 | 20 | 25 | 35 | 18 |
|  | l/L | — | 1.7 | 1.3 | 1.1 | 1.4 | 1.7 |
|  | Flatness rate w/h | — | 30 | 34 | 35 | 10 | 30 |
|  | Determination of taper angle δ | — | A | A | A | A | A |
|  | Content of joined bundle aggregate [b] | % | 9 | 12 | 15 | 8 | 10 |
| Mechanical properties | Flexural strength | MPa | 450 | 400 | 380 | 380 | 440 |
|  | CV value of flexural strength | % | 9 | 15 | 16 | 7 | 10 |
|  | Flexural modulus | GPa | 26 | 24 | 23 | 23 | 26 |
|  | CV value of flexural modulus | % | 10 | 13 | 18 | 5 | 10 |

INDUSTRIAL APPLICABILITY

We can manufacture any molded article of a fiber-reinforced resin which is required particularly with high mechanical properties and to reduce the variation of the mechanical properties.

The invention claimed is:
1. A molded article of a fiber-reinforced resin containing at least a bundled aggregate [A] of discontinuous reinforcing fibers and a matrix resin [M], wherein the average layer thickness h in said molded article of the fiber-reinforced resin is 100 μm or less, a CV value of said average layer thickness h is 40% or less, and the at least bundled aggregate [A] is obtained by cutting a partially-separated fiber bundle, prepared by forming separation treatment sections separated into a plurality of bundles and non-separation treatment sections alternately along a lengthwise direction of a fiber bundle comprising a plurality of single fibers, at an angle θ (0°<θ<90°) with respect to the lengthwise direction of the fiber bundle.

2. The molded article according to claim 1, wherein, when the molded article is subjected to ashing treatment, 20 bundled aggregates [A] are selected, the ratio 1/L of the average fiber bundle length 1 to the average fiber length L of the selected bundled aggregates [A] is 1.1 or more, and the flatness rate calculated from the ratio w/h of the width of fiber bundle w, obtained by dividing the average projection area S of the bundled aggregate [A] by the average fiber length L, to the average layer thickness h is 5 μm to 100 μm.

3. The molded article according to claim 2, wherein test pieces are cut out from the molded article in 4 directions of 0°, 45°, 90° and −45° when an arbitrary direction is set at 0°, and when a flexural modulus of each test piece is measured, a CV value of the flexural modulus is 20% or less.

4. The molded article according to claim 1, wherein cross-sectional observation is carried out in a homogeneous region of the molded article of the fiber-reinforced resin, and 80% or more of end portions of bundled aggregates [A], which are oriented with an angle α between a fiber direction and a plane of the cross-sectional observation within ±10°, among the observed bundled aggregates [A], have a taper angle δ of 10° or less.

5. The molded article according to claim 1, wherein test pieces are cut out from the molded article of the fiber-reinforced resin in 4 directions of 0°, 45°, 90° and −45° when an arbitrary direction is set at 0°, a flexural modulus of each test piece is measured and the average flexural modulus Eb is obtained, and the average flexural modulus Eb satisfies equation (1):

$$Eb > Vf \times (3/8) \times Ef \times 0.65 \quad (1)$$

Vf: volume content of reinforcing fibers contained in molded article of fiber-reinforced resin
Ef: modulus of reinforcing fibers contained in molded article of fiber-reinforced resin 6. The molded article according to claim 1, wherein test pieces are cut out from the molded article in 4 directions of 0°, 45°, 90° and −45° when an arbitrary direction is set at 0°, and when a flexural strength of each test piece is measured, a CV value of the flexural strength is 20% or less.

7. The molded article according to claim 1, wherein, when the molded article is subjected to ashing treatment, 20 bundled aggregates [A] are selected, and the average number of fibers of the selected bundled aggregates [A] is 6,000 or less.

8. The molded article according to claim 1, wherein, in the partially-separated fiber bundle, an entangled part in which the single fibers are tangled with each other and/or an entanglement accumulation part in which the entangled parts are accumulated is formed in at least one end portion of at least one of the separation treatment sections.

9. The molded article according to claim 8, wherein the bundled aggregate [A] contains at least one kind of aggregate selected from:
- a separated bundle aggregate [a] divided into an arbitrary number of bundles by separation treatment;
- a joined bundle aggregate [b] in which single fibers of the fiber bundle are joined to each other by the non-separation treatment section and/or the entangled part and/or the entanglement accumulation part; and
- a joined cut aggregate [c] in which the non-separation treatment section and/or the entangled part and/or the entanglement accumulation part intersects with a cutting plane of the partially-separated fiber bundle at the time of being cut, and the joining of single fibers of the fiber bundle to each other is cut off at the intersected part.

10. The molded article according to claim 9, wherein, in the bundled aggregate [A], the content of the joined bundle aggregate [b] is 0 to 15%.

* * * * *